United States Patent
Kim et al.

(10) Patent No.: US 7,400,636 B2
(45) Date of Patent: Jul. 15, 2008

(54) APPARATUS AND METHOD FOR ESTABLISHING HEADER COMPRESSION CONTEXT ACCORDING TO CHANNEL TYPE CHANGE IN PACKET DATA SERVICE

(75) Inventors: Soeng-Hun Kim, Suwon-si (KR); Sung-Ho Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 718 days.

(21) Appl. No.: 10/901,584

(22) Filed: Jul. 29, 2004

(65) Prior Publication Data
US 2005/0037767 A1 Feb. 17, 2005

(30) Foreign Application Priority Data
Jul. 30, 2003 (KR) .................. 10-2003-0052734

(51) Int. Cl.
H04L 12/56 (2006.01)
H04J 3/16 (2006.01)
H04J 3/18 (2006.01)

(52) U.S. Cl. .................. 370/401; 370/465; 370/477
(58) Field of Classification Search .................. 370/477
See application file for complete search history.

(56) References Cited

U.S. PATENT DOCUMENTS 5,956,490 A * 9/1999 Buchholz et al. ............ 709/245
6,300,887 B1 * 10/2001 Le ............................. 341/60
6,608,841 B1 * 8/2003 Koodli ....................... 370/474
6,839,339 B1 * 1/2005 Chuah ........................ 370/349
6,970,476 B1 * 11/2005 Jonsson et al. .............. 370/401
7,058,728 B1 * 6/2006 Eklund ....................... 709/247
7,266,105 B2 * 9/2007 Wu ............................. 370/338
7,290,063 B2 * 10/2007 Kalliokulju et al. ......... 709/247
2002/0057716 A1 * 5/2002 Svanbro et al. .............. 370/477
2004/0102212 A1 * 5/2004 Sarkkinen et al. ........ 455/552.1
2006/0116152 A1 * 6/2006 Yahagi ........................ 455/522

* cited by examiner

Primary Examiner—Chau Nguyen
Assistant Examiner—Timothy J Weidner
(74) Attorney, Agent, or Firm—The Farrell Law Firm, PC

(57) ABSTRACT

Disclosed are an apparatus and method for providing packet data service from a radio network controller (RNC) to user equipment (UE) in a mobile communication system. A radio bearer (RB) of a predetermined channel type is configured to compress and de-compress headers of packets passed between the RNC and the UE. The packet data service is provided from the RNC to the UE via the RB. When the channel type is changed, configuration information associated with an RB of the changed channel type is determined. Header compression (HC) context used in the RB of a previous channel type is acquired according to the configuration information and the RB of the changed channel type including the acquired HC context is configured. The packet data service is continuously provided via the RB of the changed channel type. Therefore, the invention reduces waste of radio resources that is due to a channel type change and delay that is due to system reset.

18 Claims, 11 Drawing Sheets

APPARATUS AND METHOD FOR ESTABLISHING HEADER COMPRESSION CONTEXT ACCORDING TO CHANNEL TYPE CHANGE IN PACKET DATA SERVICE

PRIORITY

This application claims priority to an application entitled "APPARATUS AND METHOD FOR ESTABLISHING HEADER COMPRESSION CONTEXT ACCORDING TO CHANNEL TYPE CHANGE IN PACKET DATA SERVICE", filed in the Korean Intellectual Property Office on Jul. 30, 2003 and assigned Ser. No. 2003-52734, the contents of which are hereby incorporated by reference.

BACKGROUND OF THE INVENTION

1. Field of the Invention

The present invention relates to a mobile communication system supporting packet data, and more particularly to an apparatus and method for establishing header compression context necessary for header compression/decompression when a channel type for data transfer has been changed.

2. Description of the Related Art

A universal mobile telecommunication service (UMTS) system is the third generation mobile communication system using (3G MCS) wideband code division multiple access (CDMA). 3G MCS system is based on a global system for mobile (GSM) communications. It serves as a European mobile communication system and is being developed into multimedia communication that transfers large-capacity data such as packet data, circuit data, etc. as well as voice service.

FIG. 1 shows the architecture of a conventional mobile communication system. Here, the structure of the UMTS system is shown. Referring to FIG. 1, the UMTS system comprises a core network (CN) 100 and a plurality of radio network subsystems (RNSs) 110 and 120. The plurality of RNSs 110 and 120 configure a UMTS terrestrial radio access network (UTRAN)

The RNSs 110 and 120 comprise radio network controllers (RNCs) 111 and 112 and a plurality of Node Bs 115, 113, 114 and 116. In more detail, the RNS 110 is constituted by the RNC 111 and the Node Bs 113 and 115, and the RNS 120 is constituted by the RNC 112 and the Node Bs 114 and 116. The RNCs 111 and 112 are classified into a serving RNC (SRNC), a drift RNC (DRNC) and a controlling RNC (CRNC) according to their roles. The SRNC manages information of user equipment (UE), and is responsible for data transfer with the CN 100. The DRNC is directly connected to the UE, and the CRNC controls radio resources for each of the Node Bs 113-116.

The RNCs 111 and 112 and the Node Bs 113 to 116 are connected to each other via interfaces called Iub. The RNCs 111 and 112 are connected to each other via an interface called Iur. The UE 130 and the UTRAN are connected to each other via a Uu interface (not shown in FIG. 1). The RNCs 111 and 112 allocate radio resources to the plurality of Node Bs 113 to 116 managed thereby, and the Node Bs 113 to 116 provide the radio resources allocated from the RNCs 111 and 112 to the UE 130. The radio resources are configured cell by cell. The radio resources provided by each Node B are radio resources associated with a specific cell covered by a corresponding Node B. The UE 130 establishes a radio channel using the radio resources associated with the specific cell covered by the Node Bs 113 to 116, such that data is transmitted and received via the established radio channel. Because the UE 130 recognizes only a physical channel configured on a cell-by-cell basis, distinction between the Node B 113-116 and the cell is meaningless. Hereinafter, the terms Node B and cell will be used interchangeably.

With the development of communication technology, packet data service provided by the mobile communication system has developed into broadcast/multicast service that provides identical data from a single data source to a plurality of UEs. The broadcast/multicast service can be divided into cell broadcast service (CBS), i.e., message-centered service, and multimedia broadcast/multicast service (MBMS) supporting a multimedia form such as real-time image and speech, still pictures, text, etc.

The MBMS is a service for sending identical multimedia data such as real-time images, speech, still pictures, text, etc. to a plurality of recipients over a radio network. Because an MBMS data stream must be sent to a plurality of cells in which the UEs are located, the UEs set up a point to point (PTP) connection or a point to multipoint (PTM) connection according to the number of UEs located in a corresponding cell that use the MBMS via the set-up connection, respectively.

The MBMS using the PTP connection is provided via a dedicated channel allocated to each UE. The MBMS using the PTM connection is provided via a common channel that all the UEs located within a corresponding cell can access. An MBMS system counts the number of UEs coupled to the MBMS cell by cell, and determines a channel type to be used for the MBMS according to a count value. When the number of UEs using a specific MBMS within an arbitrary cell varies, the UEs will newly establish a channel based on a new channel type under control of the RNC, respectively. Each UE receives configuration information necessary for using the new channel from the system in order to carry out a new channel setup operation. In case of the MBMS based on the Internet protocol (IP), the configuration information includes many parameters associated with protocol in a wireless zone and the IP.

As described above, because the MBMS provides identical data from a single data source to a plurality of UEs, the identical parameters are used in the IP irrespective of a channel type in the wireless zone. In particular, although the channel type for the MBMS in an arbitrary cell is changed from a PTM channel to a PTP channel, the UEs located in the cell still have the IP-related parameters for the MBMS. Nevertheless, the UE must re-receive a large amount of configuration information to carry out a radio channel setup operation based on a new channel type in the conventional MBMS system. For this reason, there are problems in that radio resources are unnecessarily wasted, which may cause a service delay or cutoff phenomenon.

SUMMARY OF THE INVENTION

Therefore, the present invention has been made in view of the above problems, and it is one object of the present invention to provide an apparatus and method that can continuously provide service using previous configuration information when a channel type for data transfer is changed or switched in a mobile communication system transferring packet data.

It is another object of the present invention to provide an apparatus and method that can perform header compression/decompression using header compression context used before a channel change when a type of radio channel for packet data transfer is changed or switched.

In accordance with one aspect of the present invention, the above and other objects can be accomplished by the provision of a method for establishing header compression (HC) context associated with header compression and de-compression according to a change of a channel type for packet data service in a mobile communication system providing the packet data service, including configuring a radio bearer (RB) of a predetermined channel type used for compressing and de-compressing headers of packets between a radio network controller (RNC) and user equipment (UE), and providing the packet data service from the RNC to the UE via the RB; when the channel type is changed to another channel type, deciding configuration information associated with an RB of the changed channel type; acquiring the HC context used in the RB of a previous channel type according to the configuration information and configuring the RB of the changed channel type including the acquired HC context; and continuously providing the packet data service via the RB of the changed channel type.

In accordance with another aspect of the present invention, the above and other objects can be accomplished by the provision of an apparatus for providing packet data service from a radio network controller (RNC) to user equipment (UE) in a mobile communication system, including a radio resource controller for allocating a radio bearer (RB) of a predetermined channel type to transport packets from the RNC to the UE and controlling the RB; and a packet data controller for including header compression (HC) context used for compressing headers of the packets on the RB, compressing the headers of the packets using the HC context and sending the packets with the compressed headers to the UE, wherein the radio resource controller decides configuration information associated with an RB of a changed channel type when the channel type is changed to another channel type, acquires the HC context used in the RB of a previous channel type according to the configuration information and configures the RB of the changed channel type including the acquired HC context.

In accordance with yet another aspect of the present invention, the above and other objects can be accomplished by the provision of an apparatus for receiving packet data service from a radio network controller (RNC) by means of user equipment (UE) in a mobile communication system, including a radio resource controller for allocating a radio bearer (RB) of a predetermined channel type to receive packets from the RNC and controlling the RB; and a packet data controller for including header compression (HC) context used for de-compressing headers of the packets on the RB, and de-compressing the headers of the packets received from the RNC using the HC context, wherein the radio resource controller receives, from the RNC, configuration information associated with an RB of a changed channel type when the channel type is changed to another channel type, acquires the HC context used in the RB of a previous channel type according to the configuration information and configures the RB of the changed channel type including the acquired HC context.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention rather unclear.

As described below, the present invention establishes a new radio channel using configuration information of a previous radio channel when a channel type for specific packet data service is changed or is switched to a different radio channel in a mobile communication system that provides the packet data service using different types of radio channels. A multimedia broadcast/multicast service (MBMS) system based on a universal mobile telecommunication service (UMTS) communication system will be described in accordance with preferred embodiments of the present invention. The preferred embodiments of the present invention are not limited by the system architecture described below. They can be applied to other systems having similar technical backgrounds.

Figure 1:
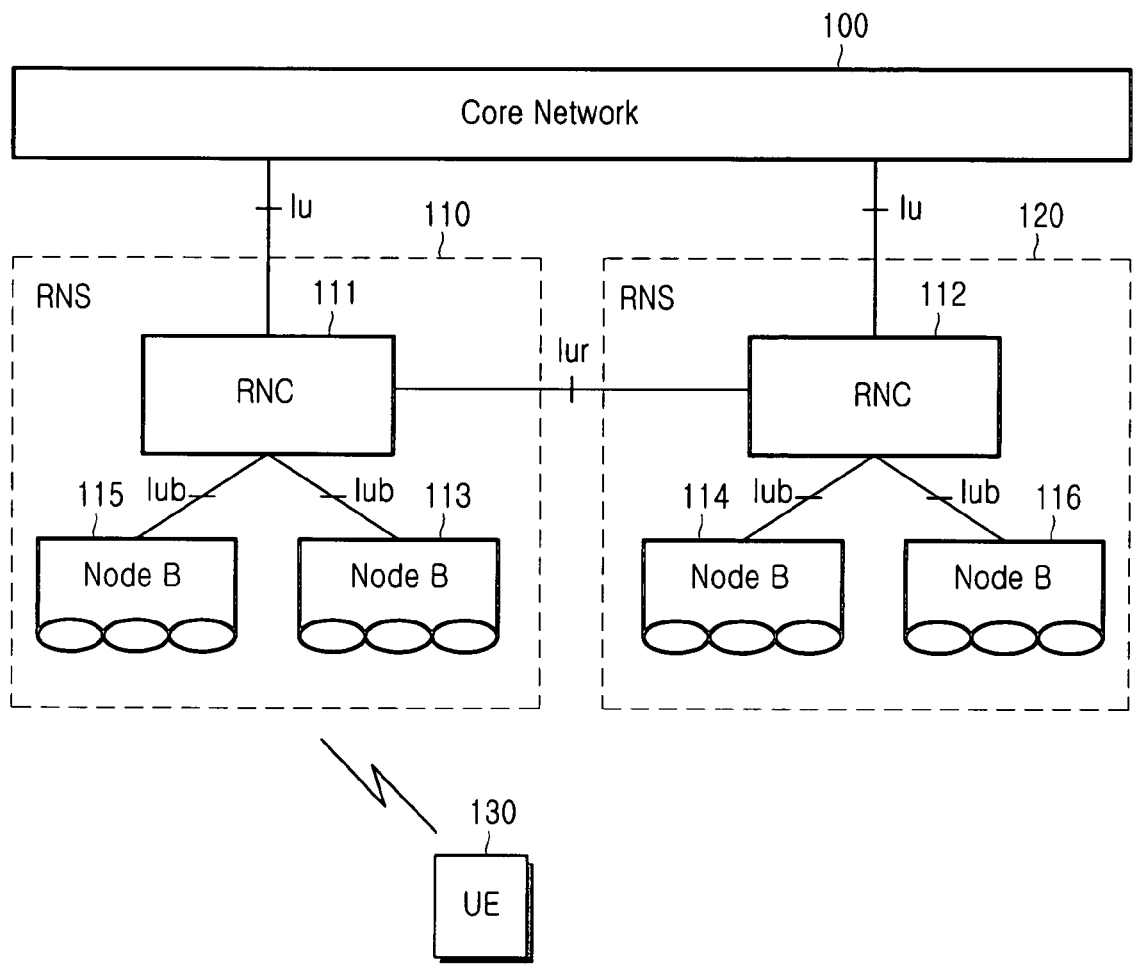
FIG. 1 is a block diagram of the architecture of a conventional mobile communication system.
Figure 2:
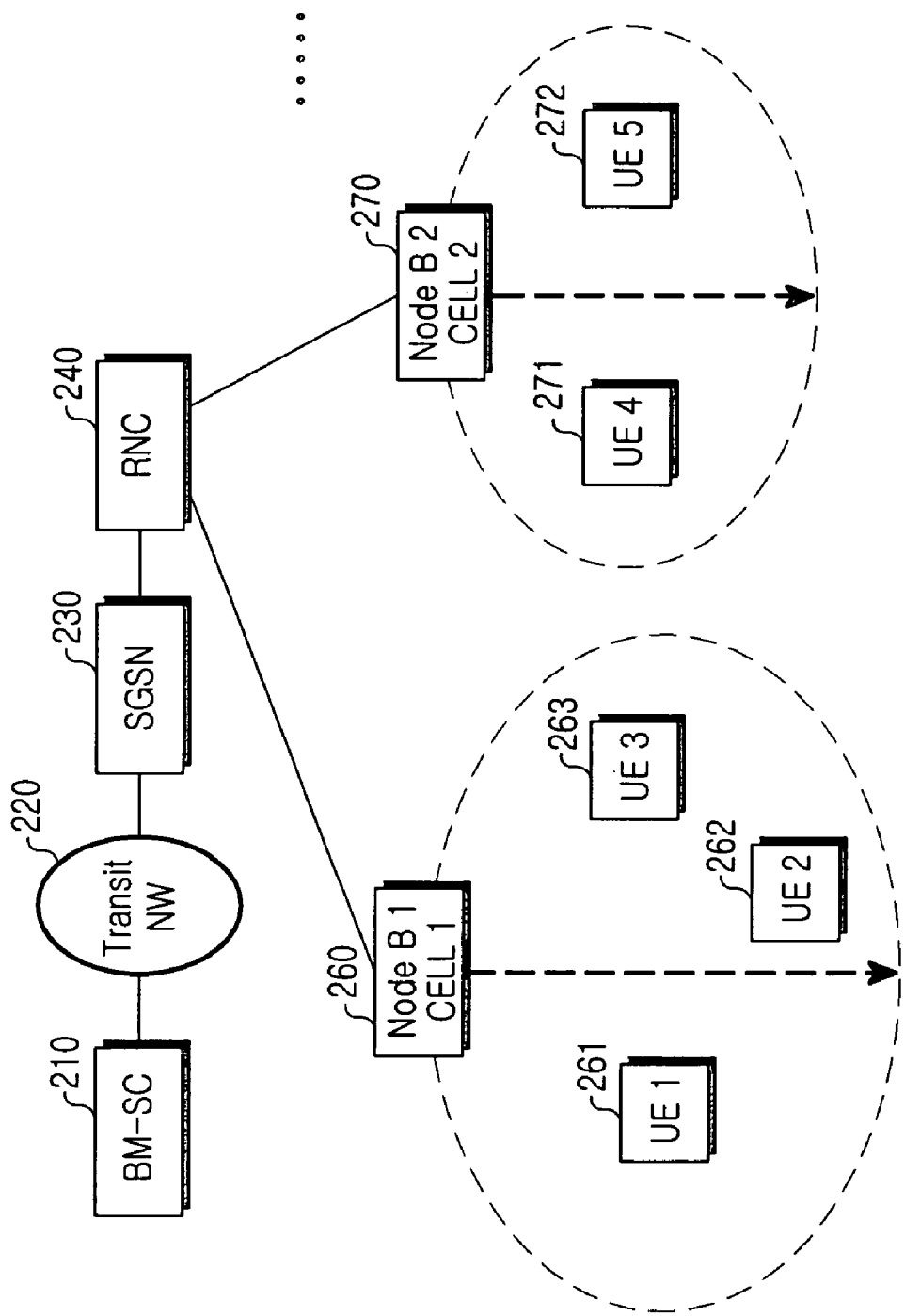
FIG. 2 is a block diagram of the architecture of a network for providing multimedia broadcast/multicast service (MBMS) in a mobile communication system.

The architecture of a network for providing the MBMS in the mobile communication system will be described with reference to FIG. 2. FIG. 2 shows the network architecture for providing the MBMS in the mobile communication system. Referring to FIG. 2, a broadcast/multicast-service center (BM-SC) 210 is a source for providing MBMS data stream. The BM-SC 210 schedules the MBMS data stream and delivers the scheduled MBMS data stream to a transit network (NW) 220. The transit NW 220 present between the BM-SC 210 and a serving general packet radio service (GPRS) support node (SGSN) 230. The transit NW 220 transfers the MBMS data stream received from the BM-SC 210 to the SGSN 230. Here, the transit NW 220 can be configured by a gateway GPRS support node (GGSN), an external network, etc. (not shown).

The SGSN 230 receiving the MBMS data stream from the transit NW 220 provides at least one service associated with the MBMS for subscribers desiring to receive the MBMS service. These subscribers may include, user equipment (UE) 261, 262, 263, 271 and 272. For example, the SGSN 230 manages data associated with MBMS service billing to be charged to the subscribers, and selectively sends MBMS service data to a specific radio network controller (RNC) 240. Moreover, the SGSN 230 establishes SGSN service context associated with the MBMS service and manages the established service context. The RNC 240 controls a plurality of Node Bs and transmits MBMS service data to the Node B (or cell) 260 or 270 associated with the UE requesting the MBMS service. Moreover, in order to provide the MBMS service, the RNC 240 controls a radio channel established by the Node B 260 or 270, establishes RNC service context associated with the MBMS service, and manages the established service context.

Figure 3:
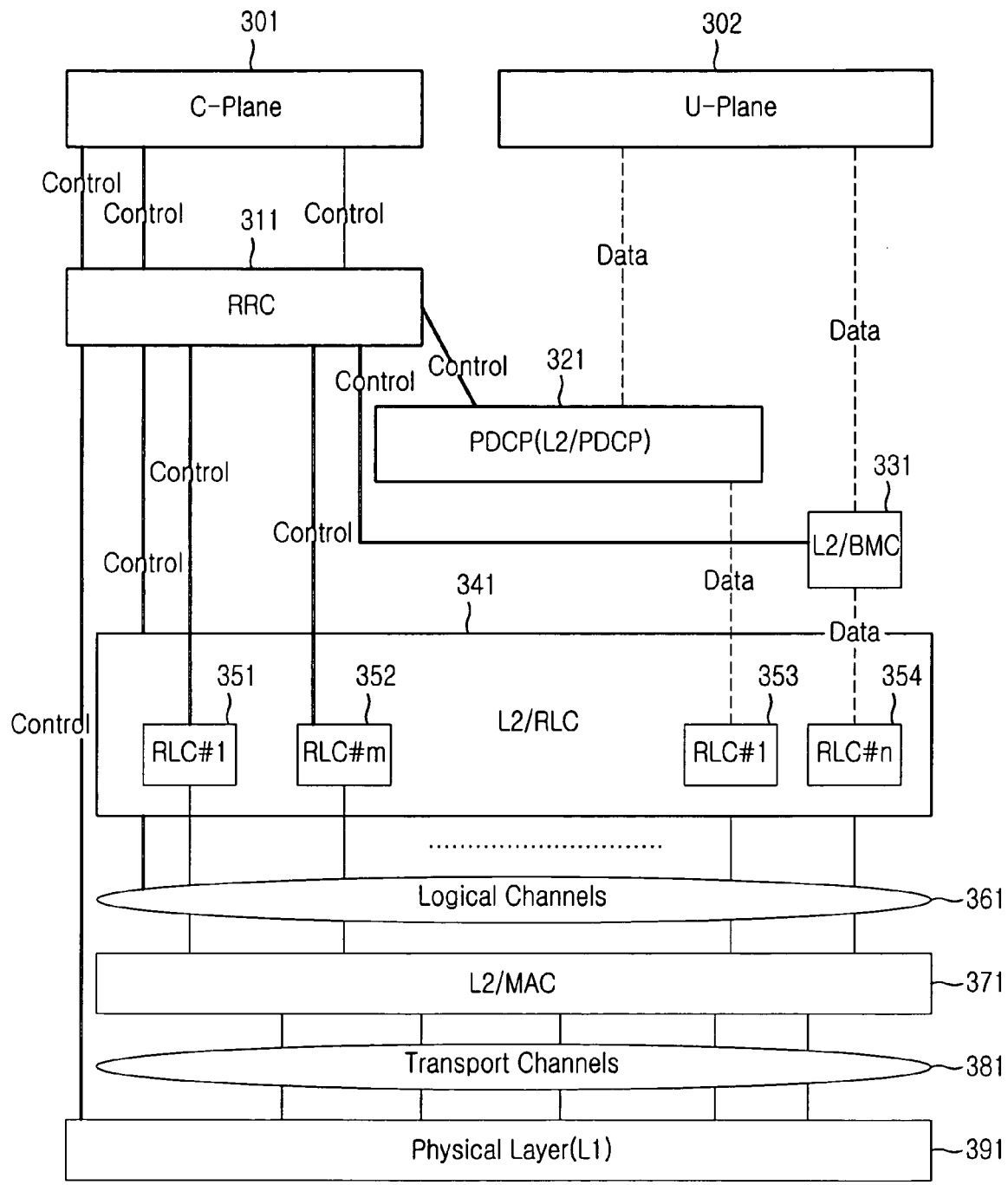
FIG. 3 is a block diagram of the hierarchical architecture of an MBMS system.

Uu interfaces established between the UEs 261 to 263, 271 and 272 and the RNC 240 will be described with reference to FIG. 3. An Iu interface, an Iub interface or the Uu interface are used for communication between nodes shown in FIG. 2. To be processed by the UMTS terrestrial radio access network (UTRAN) higher-layer messages can be divided into a control signal and user data, and can be expressed as a control plane (C-Plane) signal 301 and user plane (U-Plane) data 302. The C-Plane signal 301 and the U-Plane data 302 include messages of a non-access stratum (NAS) for signaling between the UE 261-263, 271, and 272 (FIG. 2) and the RNC 240 (FIG. 2) and messages of an access stratum (AS) for wireless access between the UE 261-263, 271, and 272 (FIG. 2) and the Node B 260 and 270 (FIG. 2).

The C-Plane 301 signal is processed by a radio resource control (RRC) layer 311, a radio link control (RLC) layer 341, a medium access control (MAC) layer 371 and a physical layer 391. The U-Plane 302 data is processed by a packet data convergence protocol (PDCP) layer 321, a broadcast/multicast control (BMC) layer 331, the RLC layer 341, the MAC layer 371 and the physical layer 391. The PDCP layer 321, the BMC layer 331 and the RLC layer 341 correspond to a second layer called Layer 2 or L2, respectively, and the physical layer 391 corresponds to a first layer called Layer 1 or L1 according to an open systems interconnection (OSI) system model.

A function of each layer will now be described. The physical layer 391 is connected to the MAC layer 371 via transport channels 381. It performs channel coding/decoding, modulation/demodulation and channelization/de-channelization functions, such that data to be transmitted is converted into a radio signal and a received radio signal is converted into data. The radio signal after the conversion is transmitted via the physical channel.

Transport channels 381 define a way of processing specific data in the physical layer 391, e.g., which channel coding scheme to use, which coding rate to use, or which size of transport block to use, etc.

The MAC layer 371 is connected to the RLC layer 341 via logical channels 361. The MAC layer 371 transfers data from the RLC layer 341 to the physical layer 391 via the appropriate transport channels 381, and transfers data transported via the transport channels 381 by the physical layer 391 to the RLC layer 341 via the logical channels 361. Moreover, the MAC layer 371 inserts additional information into the data transferred via the logical channels 361 or the transport channels 381. Alternatively, MAC layer 371 interprets inserted additional information.

The logical channels 361 are divided into a dedicated type channel associated with a specific UE and a common type channel associated with a plurality of UEs. Alternatively, the logical channels 361 are divided into a control type channel and a traffic type channel according to the type of the message received and transmitted.

Types and functions of the logical channels 361 will now be described. A broadcast control channel (BCCH) is used for downlink transfer from the UTRAN to the UE and conveys UTRAN system control information. A paging control channel (PCCH) is used for the downlink transfer from the UTRAN to the UE, and conveys the control information to the UE, which does not recognize a position of its own cell. A common control channel (CCCH) is used for transferring control information between the UE and the network, and is used when no channel connecting the UE to the RRC is present. A dedicated control channel (DCCH) is used for transferring one-to-one control information, and is used when a connection between the UE and the RRC is present. A common traffic channel (CTCH) is used for one-to-multi data transfer between the network and the UEs. The dedicated traffic channel (DTCH) is used for one-to-one data transfer between the network and the UE.

Next, types and functions of the transport channels 381 will be described. A broadcast control transport channel (BCH) is mapped to the BCCH and transports BCCH data. A paging transport channel (PCH) is mapped to the PCCH and transports PCCH data. A random access channel (RACH) is used for transferring a network access and control message and short length data from the UE to the network. A forward access channel (FACH) is used for transferring a control message and data from the network to one or many specific UEs. The FACH can be mapped to the BCCH, CTCH, CCCH, DTCH and DCCH. A dedicated transport channel (DCH) transports data and a control signal between the network and the UE, and is mapped to the DTCH and the DCCH. A downlink shared channel (DSCH) is used for transferring large-capacity data, and is a downlink channel from the network to the UE. The DSCH is mapped to the DTCH and DCCH. A high-speed DSCH (HS-DSCH) enhancing the efficiency of transfer capability is a downlink channel from the network to the UE, and is mapped to the DTCH and DCCH.

The physical channels include a primary common control physical channel (P-CCPCH) for transferring the BCH, a secondary common control physical channel (S-CCPCH) for transferring the PCH and FACH, a dedicated physical channel (DPCH) for transferring the DCH, a physical downlink shared channel (PDSCH) for transferring the DSCH, a high-speed PDSCH (HS-PDSCH) for transferring the HS-DSCH, and a physical random access channel (PRACH) for transferring the RACH. The physical channels further include a pilot channel for conveying only information associated with the physical layer irrespective of a higher layer in a state where they are not mapped with the transport channels 381, a primary synchronization channel, a secondary synchronization channel, a paging indicator channel, an acquisition indicator channel and a physical common packet channel.

After receiving a control message to be transmitted from the RRC layer 311 to an opposite party, the RLC layer 341 takes into account a type of control message and processes the control message into an appropriate format by means of transmitting-side RLC entities, that is, an RLC #1 351 and RLC #m 352. The processed control message is transferred to the MAC layer 371 using the logical channels 361. Moreover, the RLC layer 341 receives data from the PDCP layer 321 and the BMC layer 331, and processes the received data into an appropriate format by means of receiving-side RLC entities, that is, an RLC #1 353 and RLC #n 354. The processed data is transferred to the MAC layer 371 using the logical channels 361. The number of RLC entities 351-354 located in the RLC layer 341 is determined by the number of radio bearers between the UEs 261-263, 271, and 272 (FIG. 2) and the RNC 240 (FIG. 2). The RLC entities 351 to 354 operate in one of an acknowledgement mode (AM), an unacknowledged mode (UM) and a transparent mode (TM). Functions provided by the respective modes are different.

The PDCP entity 321 is located in a layer higher than the RLC layer 341, and performs a packet data control function including a function for ensuring lossless data when the RNC is changed due to UE mobility or a function for a header compression for data transferred in an IP packet format. The BMC layer 331 is located in a layer higher than the RLC layer 341 and supports broadcast service for broadcasting identical data from a specific cell to a plurality of unspecified UEs.

The RRC layer 311 performs a control function for assigning or releasing radio resources between the RNC and the UEs. The relationship between the UEs and the RNC is divided into a connected mode and an idle mode. The connected mode is an operating mode in which the RRC layer 311 of the RNC can exchange control signaling or data with a specific UE. In this case, the RRC layer 311 recognizes information of the UE in the connected mode. A radio connection necessary for the connected mode is referred to as an RRC connection. Using the RRC connection, the RNC manages radio resources assigned to the UEs and the mobility of the UEs and transfers signals from the core network to the UEs. The idle mode corresponds to the case where the RRC layer 311 does not recognize the UE within a corresponding service area. In the case, the RRC layer 311 cannot exchange control signaling or data with the UE in the idle mode.

Figure 4:
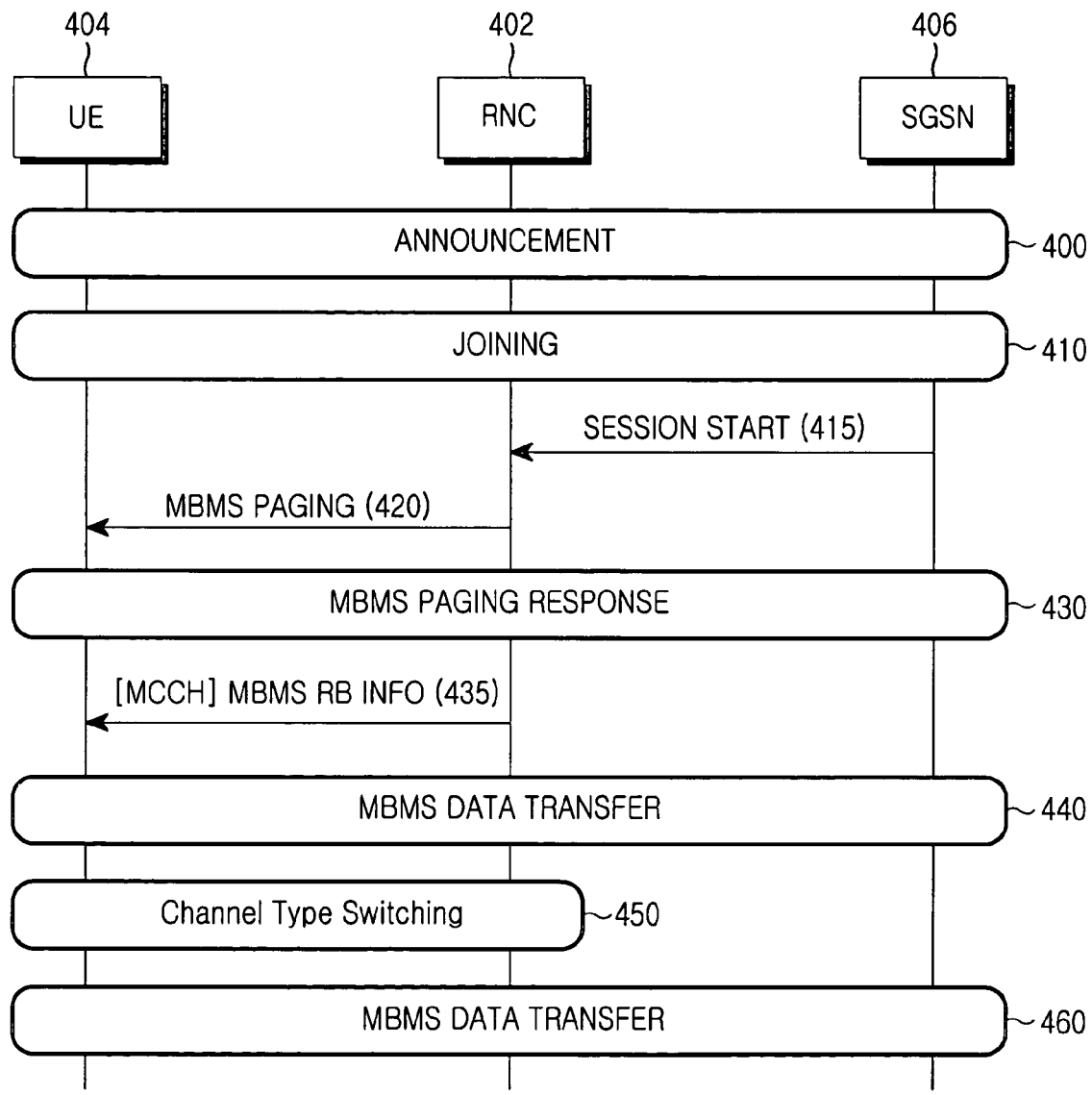
FIG. 4 is a flow chart illustrating the operations of respective nodes provided in the mobile communication system supporting the MBMS service.

Next, an operation performed between the nodes supporting the MBMS will be described. FIG. 4 is a flow chart illustrating an operation for providing MBMS service between the RNC 402 and the UE 404 desiring to receive the MBMS service. The RNC 402 provides the desired MBMS service to corresponding UEs 404 via a Node B. The Node B is not shown in FIG. 4. However, it is obvious that the MBMS service is provided via the Node B 260 and 270 (FIG. 2). Moreover, the SGSN 406 is coupled to the BM-SC (not shown) and manages the MBMS service.

As shown in FIG. 4, announcement, joining, paging and radio bearer (RB) setup processes are performed so that the MBMS service can be provided. The above-described four processes will now be described.

At step 400, the announcement process is performed. During that step the SGSN 406 announces to the UE 404 basic MBMS information including, for example MBMS identifiers (IDs) for identifying services associated with the MBMS, which are capable of being provided by the BM-SC. A MBMS service list indicating service initiation time and duration information may also be announced.

At step 410, the LE 404 performs the joining process with the SGSN 406. In the joining process, the UE 404 sends a joining request message to the SGSN 406 so that the UE 404 can join the MBMS service. The joining request message includes an ID of a specific MBMS service that the UE 404 desires to receive and an ID of the UE desiring to receive the MBMS service. Furthermore, in step 410 the SGSN authenticates the UE 404 making an MBMS service request, and notifies the UE 404 of whether or not the UE can receive the MBMS service, according to a result of the authentication. The SGSN 406 stores a list of UEs desiring to receive the MBMS service and their location information.

When the BM-SC announces the start of the MBMS service, the SGSN 406 sends, at step 415, a session start message to the RNC 402 in which the UEs performing the joining process are located. At step 420, the RNC 402 sends a paging message using a common channel such as a secondary-common control physical channel (S-CCPCH) to page the UEs to receive the MBMS service. The paging is performed to notify the UEs desiring to receive the MBMS service that the MBMS service will be initiated. The plurality of UEs are paged by paging message transfer. Step 420 is referred to as a group paging process instead of the conventional paging process.

At step 430, the UE 404 sends a response message in response to the paging message. Upon receiving the response message, the RNC 402 confirms the number of UEs to receive the MBMS service cell by cell, and determines a radio channel type of a corresponding cell. When a large number of UEs desire to receive the MBMS service from a specific cell, the MBMS service is provided via the common channel (according to a PTP channel). Otherwise, when a small number of UEs or one UE desire to receive the MBMS service from a specific cell, the MBMS service is provided via a dedicated channel to individual UEs (according to a PTM channel).

At step 435, the UE 404 performs a radio bearer (RB) setup process using RB information sent by the RNC 402 via an MBMS control channel (MCCH). The RB setup process is performed to assign radio resources necessary for providing the MBMS service between the RNC 402 and the UE 404. In the RB setup process, information associated with the MBMS RB is sent so that the MBMS service can be received without error. The UE can perform a recovery operation using the MBMS radio bearer information without error. The MBMS radio bearer information includes radio channel information, for example, orthogonal variable spreading factor (OVSF) code information, transfer format information, radio link control (RLC) configuration information, packet data convergence control (PDCP) configuration information, etc. The UEs recognize information of a radio link for providing the desired MBMS service and information of a higher layer that processes the MBMS service according to the RB setup process. At step 440, the RNC 402 provides the MBMS service through the MBMS RB, and the UEs receive the MBMS service provided through the MBMS RB.

While the MBMS data is provided, a channel type established between the RNC 402 and the UE 404 may be changed or switched due to movement of the UEs receiving the MBMS service. For example, when a large number of UEs in a specific cell make a specific MBMS paging response, respectively, the RNC provides the MBMS service using the common channel in the cell according to the PTM connection type. When most of the UEs move to other cells, an operation for continuously providing the MBMS service according to the PTM type is inefficient. That is, when the number of UEs receiving the MBMS service located within the cell is a small number, the MBMS service is preferably supported according to the PTP type.

At step 450, the RNC 402 decides to change or switch the channel type supporting the MBMS service in a specific cell, exchanges a predetermined control signal with the UEs located in the cell, and configures a new transport channel. At step 460, the RNC 402 continuously transports the MBMS service using the newly configured transport channel.

One very important application in the MBMS service is the multimedia streaming service. The most efficient method for providing the multimedia streaming service from the IP-based packet data network is Internet protocol/user datagram protocol/real time protocol (IP/UDP/RTP). Because the total header size of an IP/UDP/RTP packet is 40 to 60 bytes, it is not efficient for an un-compressed IP/UDP/RTP packet to be sent by radio. Thus, as the PDCP entity of the RNC 402 performs header compression for the IP/UDP/RTP packet, a header of the IP/UDP/RTP packet is compressed into several bytes and the compressed header is sent through the Uu interface. The PDCP entity of the UE de-compresses the compressed header. A header compression technique called robust header compression (ROHC) is used for the MBMS service. In this case, the PDCP entities of the RNC 402 and the UE 404 for the MBMS service include a header compressor and a header de-compressor using identical header compression information based on the ROHC, respectively.

Figure 5:
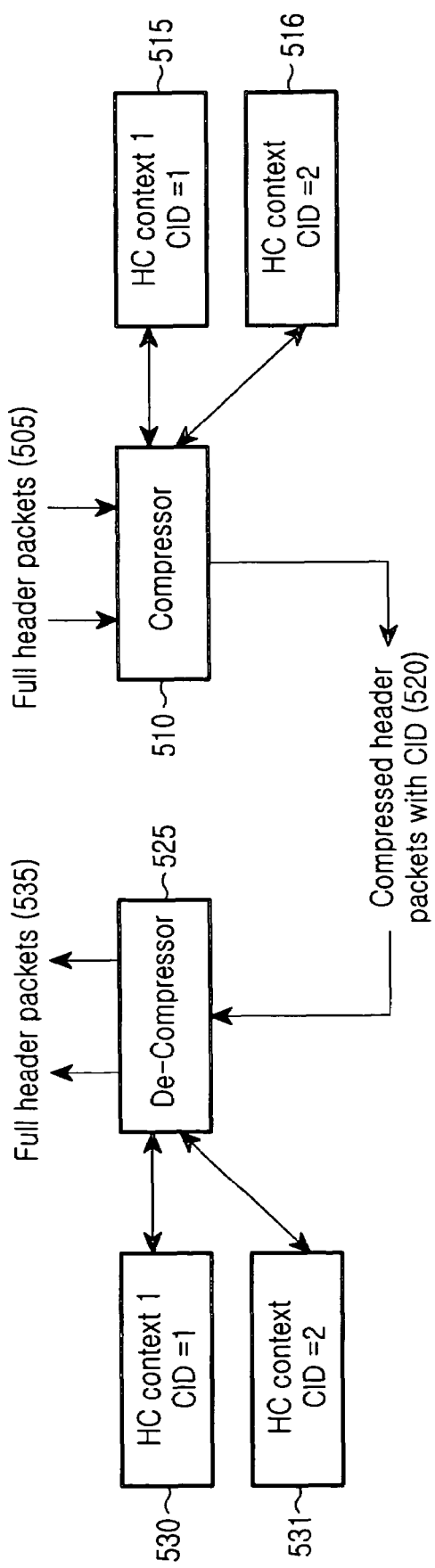
FIG. 5 is a block diagram illustrating an operation for compressing a header of MBMS packet data in a radio network controller (RNC) and decompressing the compressed header in user equipment (UE)

FIG. 5 shows a typical header compression/de-compression operation. When receiving a packet with an un-compressed header, or, a full packet 505, from a higher layer, a header compressor 510 compresses the header of the packet according to one or a number of different pre-defined techniques. The compressed header includes a context ID (CID) indicating the header compression context used for the header compression. CIDs indicate header compression (HC) contexts 515 and 516 used for storing information associated with the packet header compression. The header de-compressor 525 de-compresses headers using HC contexts 530 and 531 corresponding to the CIDs of the packets, and sends full header packets 535 having the de-compressed headers to a higher layer. As described above, when the header compression is carried out, the radio resources can be efficiently used as only the compressed header is transmitted/received through a transmission link.

The HC contexts 515, 516, 530 and 531 include information associated with the header compression/de-compression and store header contents of the previously compressed packets and other parameters. The HC contexts 515, 516, 530 and 531 have unique CIDs. The packets use identical HC context because packets with the same traffic type belonging to a packet stream include the identical source IP address, the identical destination IP address, the identical source port number and the identical destination port number, When receiving full header packets 505 from the higher layer, the header compressor 510 determines HC contexts mapped to a corresponding packet stream using an IP address and port number of the received packets. Alternatively, as the header compressor 510 tracks an arrival path of the full header packets 505 from the higher layer, it determines a packet stream and HC contexts associated with the packets 505.

A header of the IP/UDP/RTP packet is configured by various types of fields. The fields can be classified according to a field type, as follows.

Fields which cannot be changed when a call is in progress include a source IP address field, a destination IP address field, a source port number field, a destination port number, etc.

Fields which vary regularly when a call is in progress include an RTP sequence number (SN) field, etc.

Fields which vary irregularly when a call is in progress include an IP ID field, a time to live (TTL) field, etc.

The field type is variable in some cases. Because the field type is not directly related to the present invention will not be described in detail.

The header compressor 510 deletes the non-variable fields and takes into account values of the variable fields, when the call is in progress. For example, a regularly variable field value is replaced with a delta or change in value indicating a difference between a previous field value and a subsequent field value. An irregularly variable field value is maintained when the call is in progress., The header compressor 510 inserts the CID into each compressed header, completes the header compression, and sends packets 520 having the compressed headers to the UE, where they are processed by the compressor 525.

The header de-compressor 525 provided in the UE determines HC contexts 530 and 531 to be used for the header de-compression using CIDs of the received packets 520, and de-compresses headers of the packets 520 according to the determined HC contexts 530 and 531. That is, a corresponding field value of the HC context is inserted into the non-variable field. A value in which a corresponding field value of the HC context and a delta value of the received packet are added is inserted into a regular variable field. Corresponding field values of the received packets 520 are inserted into irregular variable fields and then the headers are decompressed. The packets 535 with de-compressed headers are transferred to the higher layer.

In order for the header compression/de-compression to be performed as described above, the header compressor 510 and the header de-compressor 525 must have identical HC context. The identical HC context is achieved by performing a process for initializing the HC context before performing the header compression and the header decompression, respectively. The process for initializing the HC context typically sends a CID recognized by the header compressor 510 and all field values to the header de-compressor 525 using a plurality of packets. The header de-compressor performs an operation for configuring the HC context with the CID and field values.

Figure 6:
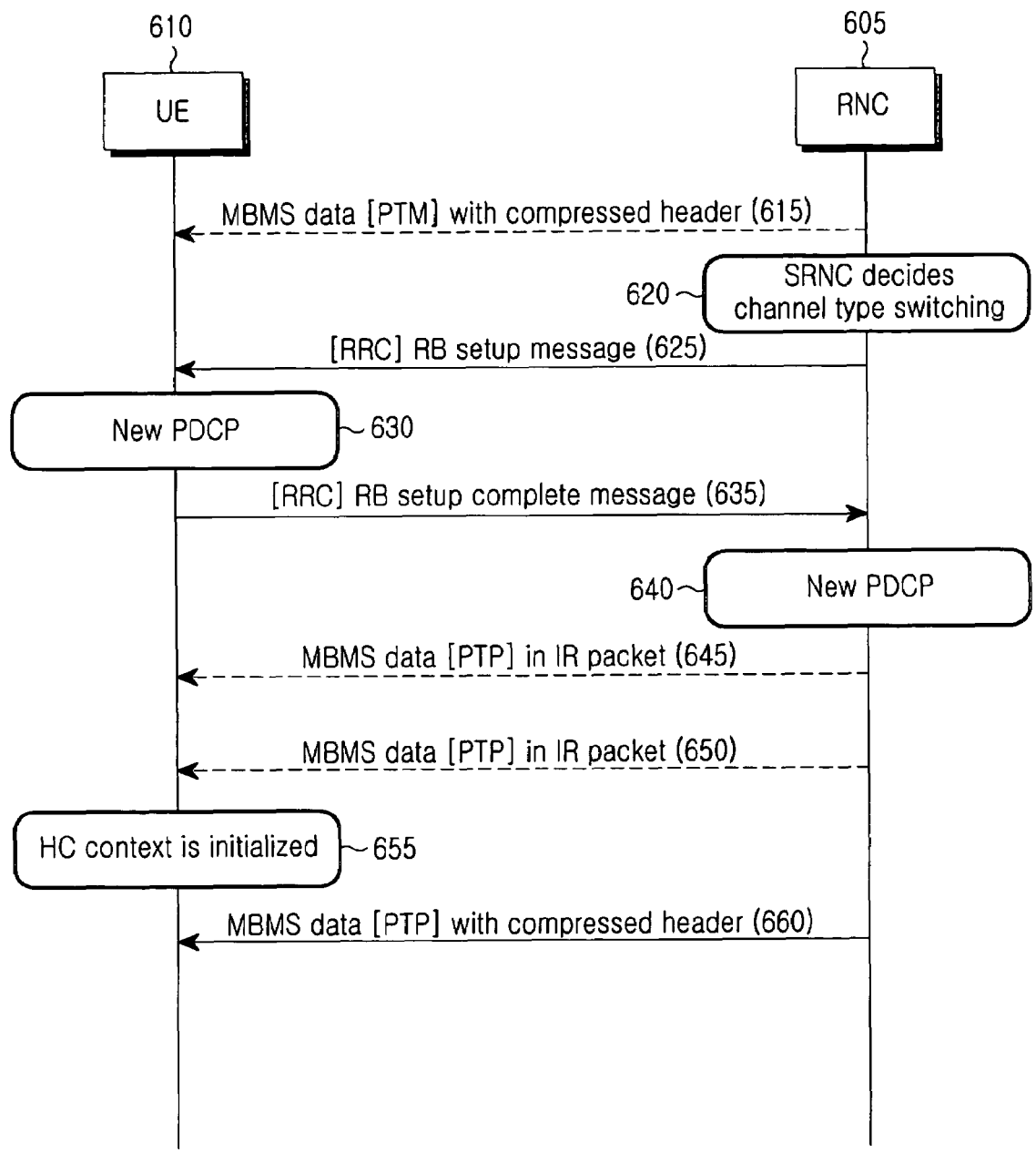
FIG. 6 is a flow chart illustrating header compression and decompression operations of respective nodes provided in the mobile communication system supporting the MBMS service.

The process for initializing the HC context for the header compression/de-compression is performed when a radio bearer (RB) is initially established or is changed. Accordingly, when a channel type is changed as shown in FIG. 4, the process for initializing the HC context is performed. The process for initializing the HC context, where the channel type for the MBMS service is changed, will be described with reference to FIG. 6. FIG. 6 illustrates the situation where the channel type is changed from a PTM channel to a PTP channel.

Referring to FIG. 6, at step 615 the RNC 605 sends MBMS databased on a packet with a compressed header using the PTM channel (i.e., common channel). When the number of UEs located within the specific cell is reduced, the RNC 605 makes a decision to send the MBMS data using the PTP channel (i.e., dedicated channel) in the cell at step 620.

At step 625, the RNC sends an RB setup message containing configuration information of the PTP channel to the UE 610. At step 630, the UE 610 newly configures a PDCP entity, a header de-compressor, an RLC entity and a MAC entity so that the MBMS data received through the PTP channel can be processed. At step 635, the UE notifies the RNC that the PTP channel setup has been completed, by sending an RB setup complete message to the RNC. At step 640, the RNC newly configures a PDCP entity, a header compressor, an RLC entity and a MAC entity so that the MBMS data to be sent through the PTP channel can be processed.

In order for the header compressor and the header de-compressor to perform interoperation, they must include the identical HC context according to the HC context initialization operation. Accordingly, at step 645 the RNC 605 sends an initialization and refresh (IR) packet for initializing the HC context for the header compression/de-compression to the UE. The IR packet includes basic information for the header de-compression, and more particularly includes initial values of non-variable and regularly variable fields, etc. At step 650, the IR packet is transmitted a certain number of times. The repeat of the transmission is performed to increase the reliability of header de-compression. At step 655, the header de-compressor receives the IR packet without error and then completes the HC context initialization. At step 660, the RNC 605 sends the MBMS data using a packet with a compressed header, and the header de-compressor of the UE 610 de-compresses the compressed header using the HC context.

Figure 7:
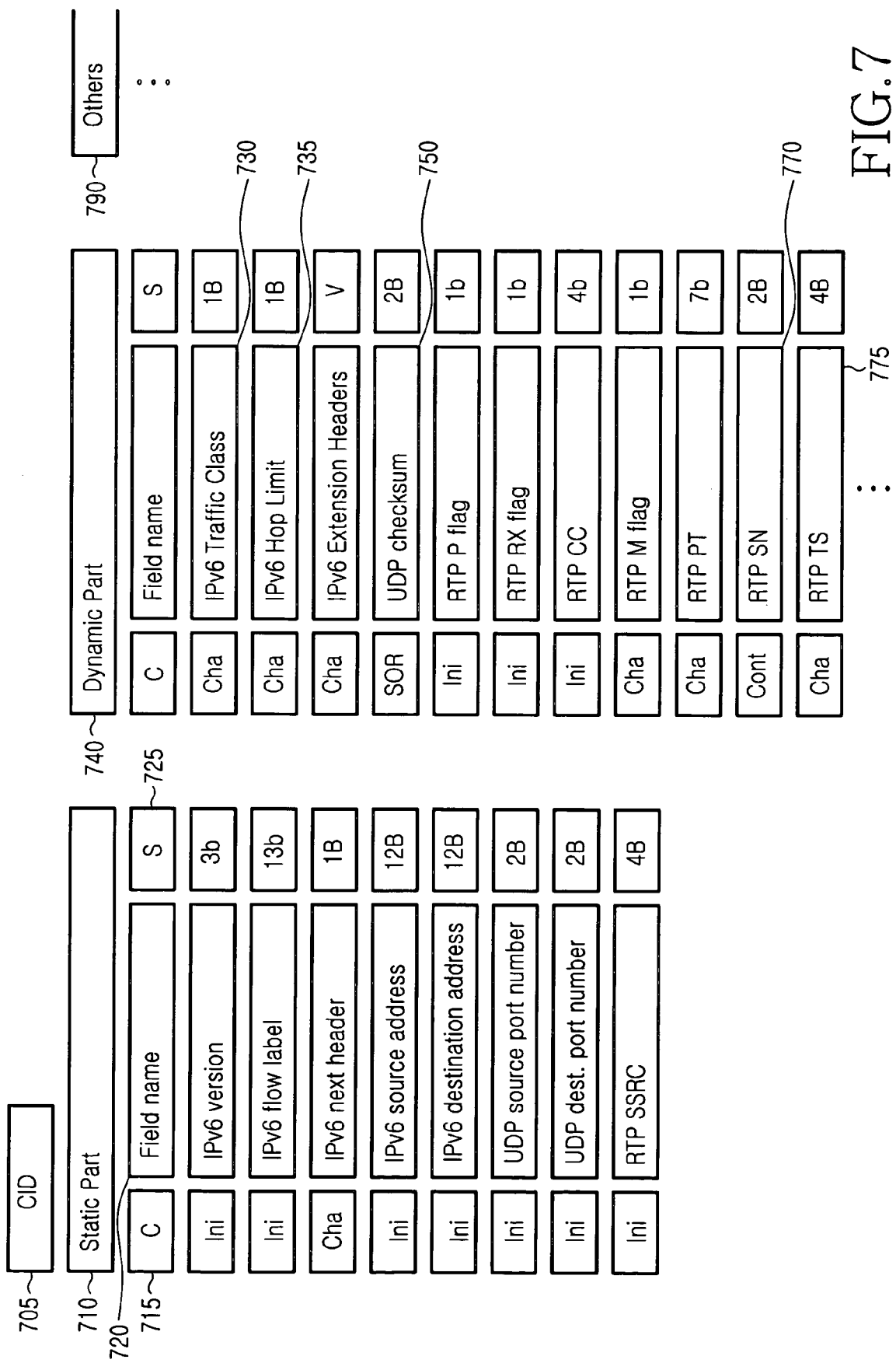
FIG. 7 is a structure of header compression context used for header compression/decompression.

Next, the header compression/de-compression based on the ROHC and the HC context will be described in detail. FIG. 7 shows an HC context structure. The HC context structure varies according to the header compression technique used or the type of compression target header. The HC context shown in FIG. 7 is a structure in which the ROHC technique is applied to IPv6, UDP and RTP. The HC context stores data to be used for the header compression and de-compression and related parameters as described above. The structure of the HC context shown in FIG. 7 shows common portions between the header compressor and the header de-compressor. However, the HC context can include other portions not shown in FIG. 7. Moreover, HC context structures in the header compressor and the header de-compressor can be slightly different from each other. The difference is not directly related to the present invention and hence will not be described.

Each HC context provided in the header compressor/de-compressor has a unique CID 705. The HC context is configured by the CID 705, a static part 710, a dynamic part 740 and other parameters 790. The respective parts store header values or configuration parameters type by type. As shown in FIG. 7, the parts are distinguished by a field name 720 indicating a name of a field, a characteristic C of a field 715, a size S of a field 725, etc. The field size S 725 uses "b" when being expressed in a bit format, and uses "B" when being expressed in a byte format. Moreover, a value "V" indicates that a corresponding field size is variable. The field name 720 indicates a name of a protocol to which a corresponding field belongs together with the field name. For example, a field "IPv6 version" is configured by a protocol name and version information based on IPv6. The field characteristic "C" 725 can be distinguished as follows.

A field characteristic "Ini" has a constant value for the duration of a packet stream, and its field is not transferred after transfer from the header compressor to the header de-compressor is initiated during the context initialization process. The value of a field characteristic "Cha" is not constant and its field is transferred whenever the field value is changed.

The value of a field characteristic "Cont" constantly varies (e.g., monotone increasing) and is included in all packets.

A field characteristic "SOR" varies constantly and irregularly, and is included in all packets, if it exists. But, the field characteristic "SOR" could be disabled for some call, and is not included at all in that case. An example of the field is "UDP checksum". 750.

The static part 710 stores non-variable header field values for the packet stream duration. Thus, characteristics of the field values stored in the static part 710 mostly indicate "Ini".

The dynamic part 740 stores variable header field values for the packet stream duration. For example, a field "IPv6 Traffic Class" 730 includes information indicating a method for processing a corresponding payload in each router or a priority. The field "IPv6 Traffic Class" 730 has in general a constant value in a single packet stream. However, because the probability of a change of the header field value cannot be excluded, the field "IPv6 Traffic Class" 730 is included in the dynamic part 740. Moreover, a field "IPv6 Hop Limit" 735 indicates the number of routers through which a corresponding packet is transmitted and has a value varying whenever a transmission path is changed.

Other parameters 790 store configuration information of the HC context. For example, the parameters 790 store information indicating an operating mode associated with the HC context and the presence of mode transition.

The header compression/de-compression operation will now be described in detail with reference to the configuration information of the HC context. First, the header compression operation performs the following steps.

1. Header field values coupled to the characteristic "Ini" are removed from a packet sent from a higher layer.

2. If a header field value coupled to the characteristic "Cha" in the packet transferred from the higher layer is the same as a value stored in the HC context, a corresponding field is removed. However, if the values differ, the corresponding field is maintained.

3. Bits other than last significant bits (LSBs) necessary for inferring a header field value coupled to the characteristic "Cont" are removed from a corresponding header field included in a packet transferred from the higher layer. Technique for sending only necessary LSBs rather than a total of bits is called window-based LSB encoding (W-LSB). Because a real time transport protocol time stamp (RTP TS) 775 shown in FIG. 7 has a constant relation with a real time transport protocol sequence number (RTP SN) 770, it can be inferred from the RTP SN 770. However, a relationship between the RTP TS 775 and the RTP SN 770 can vary in some cases. Whenever the relationship varies, a value of the RTP TS 775 is maintained.

4. Field values stored in the HC context are updated by header field values transferred from the higher layer, and the updated field values are stored.

5. A packet having the compressed header, CID and payload is sent.

Next, the header de-compression operation is described.

1. One of a plurality of stored HC contexts is selected using a CID value of the received packet.

2. Header fields coupled to the characteristic "Ini" are added to a header of the received packet, and values stored in the HC context are inserted into the added header fields 3. If a header field coupled to the characteristic "Cha" is not included in the received packet, values stored in the HC context are inserted into the added header field.

4. The RTP SN of the received packet is replaced with a value determined by the RTP SN value stored in the HC context and the LSBs included in the received RTP SN field.

5. A value determined by the RTP SN is inserted into the RTP TS of the received packet.

6. A de-compressed header is transferred to the higher layer together with the payload, and the HC context is updated with the contents of the de-compressed header.

As described above, when a type of radio channel for providing the MBMS service changes while the MBMS service is being provided, the UEs newly establish an RB associated with a new channel type and perform a process for initializing the HC context for the header compression/de-compression, respectively. Although a channel type is changed or switched, a new RB is available in a state where HC context of the existing radio bearer is not changed. This is because the MBMS service is provided from an identical single source.

If a channel type is changed while the MBMS service is being provided in accordance with the preferred embodiment of the present invention, a new HC context is configured using information of the existing HC context without a procedure for transmitting and receiving IR packets.

Figure 8:
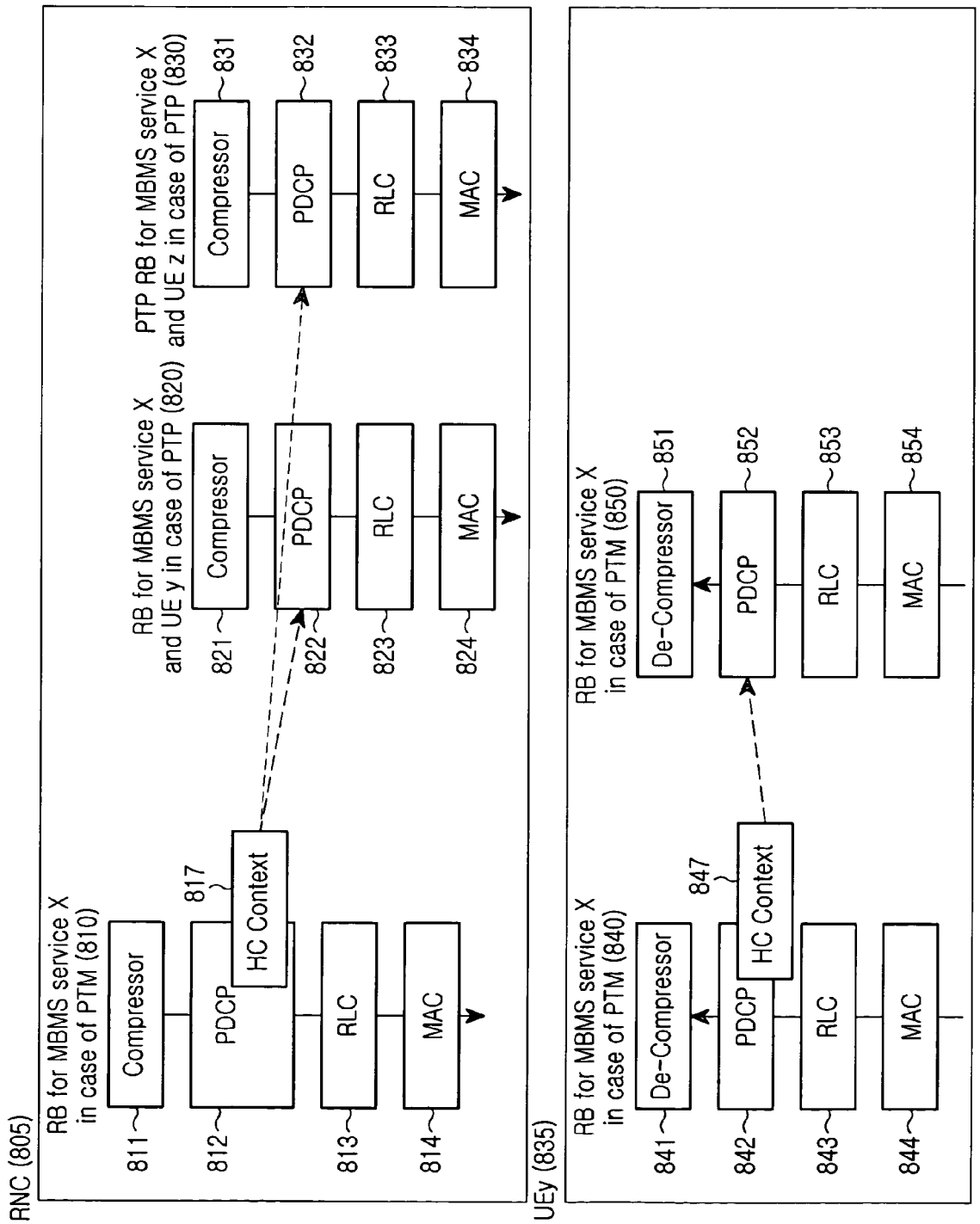
FIG. 8 is a flow chart illustrating a local transfer operation for the header compression context in the RNC and the UE in accordance with a preferred embodiment of the present invention.

An operation for changing or switching the channel type from the PTM type to the PTP type will now be described with reference to FIG. 8. When a channel type is changed from the PTP type to the PTM type while new UEs receive the MBMS service, the new UEs must receive HC context information. An operation for establishing HC context in accordance with the preferred embodiment of the present invention will be described with reference to the annexed drawings. An RNC 805 provides a specific MBMS service X using RBs 810, 820 and 830. As shown in FIG. 8, an RB for transporting data via the PTM channel and an RB for transporting data via the PTP channel have the same structure. For convenience of explanation, the RB for processing data to be transported via the PTM channel is referred to as the PTM RB 810, and the RB for processing data to be transported via the PTP channel is referred to as the PTP RB 820 or 830.

Packets of the MBMS service X are transported to a plurality of UEs including a UE y 835 under control of the RNC 805 via the PTM RB 810. A PDCP entity 812 of the PTM RB 810 manages HC context 817, and a header compressor 811 compresses headers of the packets of the MBMS service X using the HC context 817.

The UE y 835 includes a PTM RB 840 to receive the MBMS service X via the PTM channel. The PTM RB 840 is configured by a header de-compressor 841, a PDCP entity 842, an RLC entity 843, a MAC entity 844, etc. as in the PTM RB 810. The header de-compressor 841 de-compresses headers of the received packets of the MBMS service X using the HC context 847.

Assuming that the channel type providing the MBMS service X is changed or switched from the PTM channel to the PTP channel as the number of UEs receiving the MBMS service from the RNC 805 is reduced, the RNC 805 must newly configure the PTP RBs for the UEs receiving the MBMS service X. Data processed through one RB is transported via a common channel while the PTM channel is used, but data processed through an individual RB UE by UE is transported via a dedicated channel configured for individual UEs.

When the UE y 835 and the UE z (not shown) are still receiving the MBMS service X in a state where a channel providing the MBMS service X is changed from the PTM channel to the PTP channel, the RNC 805 decides RB configuration information associated with the PTP RB 820 for the UE y 835 and the PTP RB 830 for the UE z so that the MBMS service x can be supported. That is, the RNC 805 determines configuration information for newly configuring header compressors 821 and 831, PDCP entities 822 and 832, RLC entities 823 and 833 and MAC entities 824 and 834. The RNC 805 sends a control message containing the RB configuration information to the UE y 835 and the UE z.

Operation of the UE y 835 receiving the control message will be described next. Because operation of the UE z is the same as that of the UE y 835, the operation of the UE z will not be described. The UE y 835 receives the control message and configures the PTP RB 850 using the RB configuration information included in the control message. That is, the UE y 835 configures a header de-compressor 851, a PDCP entity 852, an RLC entity 853, a MAC entity 854, etc. When an operation for configuring the PTP RB 850 is completed, the UE y 835 carries out a local transfer operation for the HC context 847 used in the PTM RB 840 to the new PTP RB 850. Here, local transfer means internal transfer inside the UE rather than transfer between the UE and the RNC. The UE y 835 completes the PTP RB configuration and the local transfer for the HC context 847 and then sends a response message containing notification information indicating that the local transfer has been completed to the RNC 805.

The RNC 805 receiving the response message configures the PTP RB 820 to support data of the MBMS service X for the UE y 835, that is, the header compressor 821, the PDCP entity 822, the RLC entity 823, the MAC entity 824, etc. Subsequently, the RNC 805 carries out the local transfer, to the newly configured PDCP entity 822, for the HC context 817 managed by the existing PDCP entity 812.

As described above, if the RNC 805 completes the RB configuration based on the UE and the local transfer for the HC context, it can support the MBMS service X for the UE with the PTP channel. The RNC 805 provides packets of the MBMS service X to the UE y 835 using the PTP RB 820. Then, the UE y 835 receives the packets of the MBMS service X using the PTP RB 850.

Figure 9:
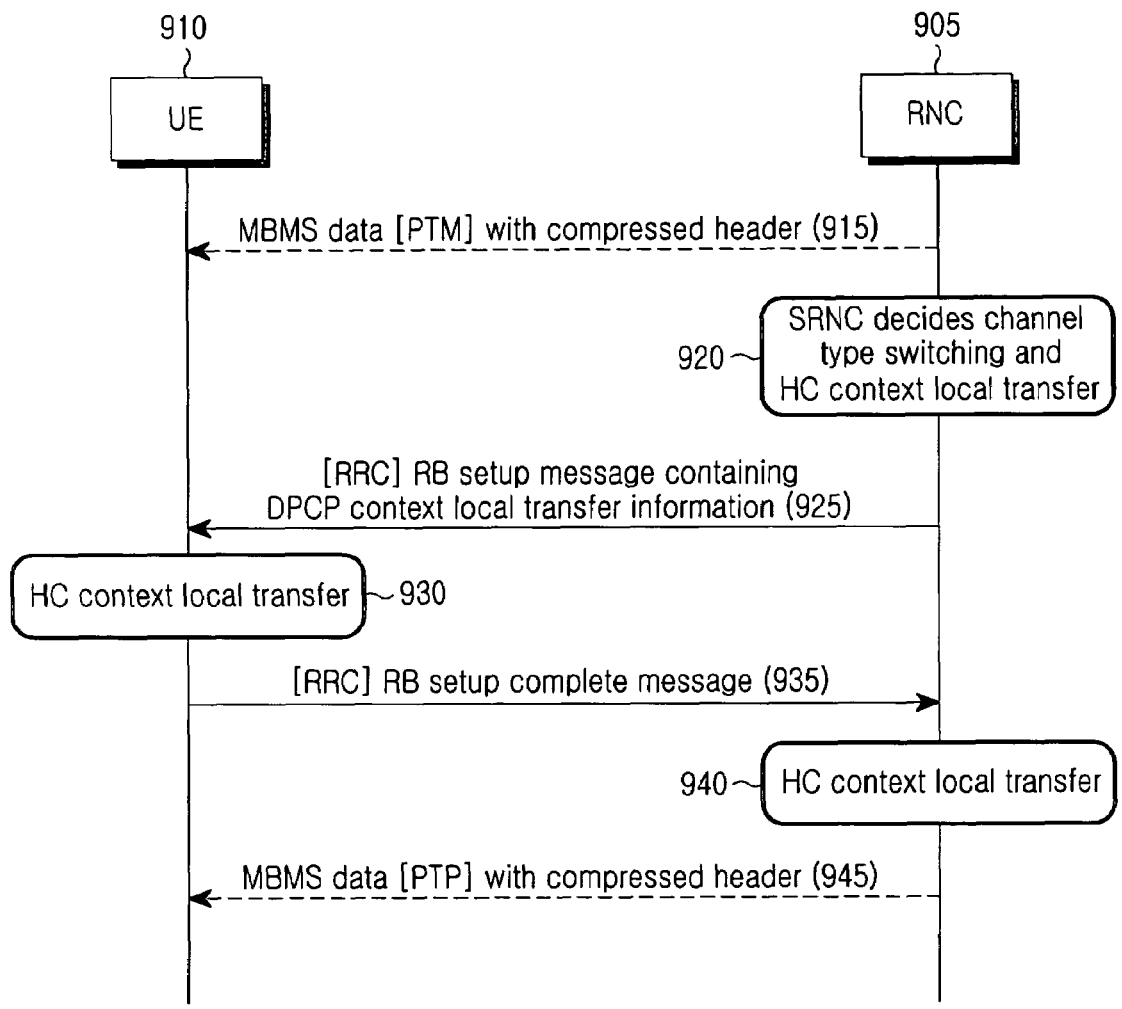
FIG. 9 is a flow chart illustrating header compression and decompression operations in respective nodes of the mobile communication system supporting the MBMS service in accordance with a preferred embodiment of the present invention.

FIG. 9 shows an operation for setting up HC context in accordance with the preferred embodiment of the present invention. The RNC serves as both a serving RNC (SRNC) and a controlling RNC (CRNC). The SRNC stores UE-related information and is a node in which the PTP RB starts. That is, the SRNC configures the RBs 820 and 830 UE by UE as shown in FIG. 8. The CRNC is an RNC for controlling a cell in which corresponding UEs are located and is a node in which the PTM RB starts. That is, the CRNC configures the PTM RB 810 for processing data via the PTM channel as shown in FIG. 8. Typically, the SRNC and CRNC for a specific UE are identical. However, when the UE is moved from a cell area covered by the SRNC to another cell area covered by another RNC, the SRNC and CRNC for the UE are different from each other.

Referring to FIG. 9, at step 915 the RNC 905 provides the MBMS service via the PTM channel to the UE 910. A header compressor of the RNC 905 and a header de-compressor of the UE 910 use the identical HC context. MBMS data, sent at the above step 915 is sent together with the header compressed by the HC context stored in the header compressor.

At step 920, the RNC 905 decides to change or switch a channel for providing the MBMS service from the PTM channel to the PTP channel, and decides to use the HC context in the PTP channel, which has been used in the PTM channel. As described above, a change of the channel for supporting the MBMS service is changed or switched results from a reduced number of UEs receiving the MBMS service from the specific RNC 905. That is, if the number of UEs receiving the MBMS service is equal to or smaller than a predetermined number, it is more efficient for the MBMS service to be transported via the PTP channel rather than the PTM channel. The RNC 905 decides configuration information of a PTP RB for providing the MBMS service to the UE 910 via the PTP channel. The configuration information of the PTP RB includes configuration information of the header compressor, the PDCP entity, the RLC entity, the MAC entity, etc. as described with reference to FIG. 8.

At step 925, the RNC 905 sends an RB setup message containing the PTP RB configuration information and PDCP local transfer information instructing the UE 910 to use a previous PDCP context. The PDCP context local transfer information is instructing the header de-compressor of the PTP RB to use the HC context used in the header de-compressor of the PTM RB, and may be configured as in the following example:

PDCP context local transfer information={MBMS RB identity, Local transfer instruction}

The MBMS RB identity is a previous RB identity having HC context undergoing the local transfer by the UE 910. For example, the MBMS RB identity indicates the PTM RB 840 used for processing data to be transferred via the PTM channel in FIG. 8. The local transfer instruction directs the HC context 847 of the PTM RB 840 to be locally transferred to the PTP RB 850.

At step 930, the UE 910 newly configures the PTP RB using the RB information recognized from the RB setup message reception. Similarly, the newly configured PTP RB is configured by the header de-compressor, the PDCP entity, the RLC entity, the MAC entity, etc. The PDCP context local transfer information is included in the RB setup message. The UE 910 transfers the HC context of the PTM RB identified by the MBMS RB identity included in the received message to the newly configured PTP RB, that is, carries out local transfer. Operation of the HC context local transfer performed by the UE 910 will be described below with reference to FIG. 11.

At step 935, the UE 910 sends an RB setup complete message to the RNC 905. The RB setup complete message includes information indicating that the UE 910 has completed the PTP RB configuration and the HC context local transfer.

At step 940, the RNC 905 receiving the RB setup complete message, configures the PTP RB, that is, the header compressor, the PDCP entity, the RLC entity, the MAC entity, etc. according to the PTP RB configuration information. Then, the RNC 905 transfers the HC context of the PTM RB to the newly configured PTP RB, that is, carries out a local transfer operation. The local transfer operation for the HC context performed by the RNC 905 will be described below with reference to FIG. 10. At step 945, the RNC 905 sends the MBMS data using the newly configured PTP RB. The UE 910 receives the MBMS data using the newly configured PTP RB.

Figure 10:
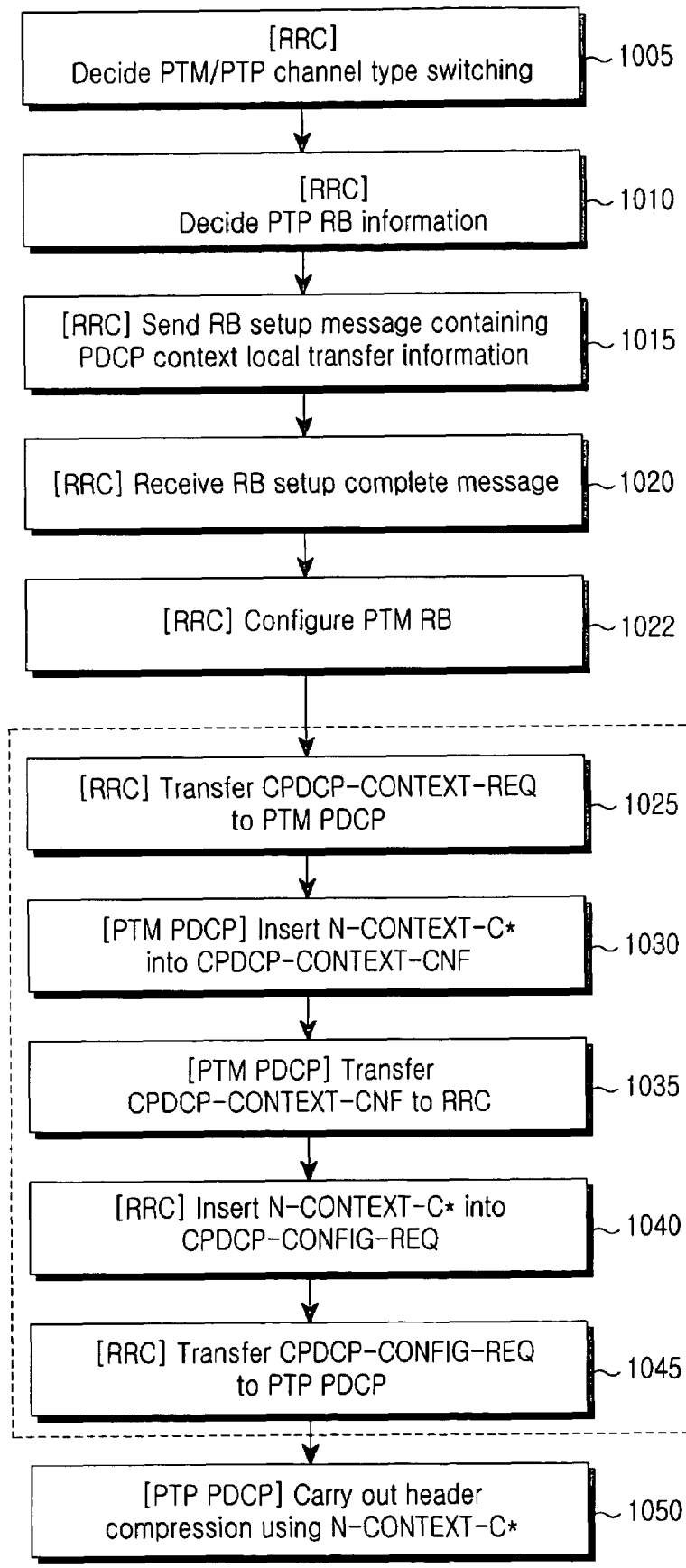
FIG. 10 is a flow chart illustrating an operation of the RNC supporting the MBMS in accordance with a preferred embodiment of the present invention.

FIG. 10 shows operation of the RNC in accordance with the preferred embodiment of the present invention. At step 1005, the RRC layer of the RNC decides to change a channel for providing the MBMS service X in a cell Y from the PTM channel to the PTP channel. Such decision results from a reduced number of UEs receiving the MBMS service X from the cell Y. At step 1010, the RRC layer determines PTP RB configuration information based on each UE receiving the MBMS service X. The number of PTP RBs determined at the above step 1010 is the same as the number of UEs still receiving the MBMS service X from the cell Y. Thus, steps 1015 to 1050 are performed by individual UEs.

At step 1015, the RRC layer sends an RB setup message to the UE receiving the MBMS service X. The RB setup message includes the PTP RB configuration information and the PDCP context local transfer information. The UE performs PTP RB configuration and HC context local transfer according to the PDCP context local transfer information and sends an RB setup complete message as a response message. At step 1020, the RRC layer receives the RB setup complete message from the UE. The RB setup complete message includes information indicating that the UE has completed the PTP RB configuration and that the UE has completed the local transfer operation for the HC context. At step 1022, the RRC layer receiving the RB setup complete message configures the PTP RB, that is, the header compressor, the PDCP entity, the RLC entity, the MAC entity, etc. Next, a process for carrying out local transfer for the HC context will be described with reference to steps 1025 to 1050.

At step 1025, the RRC layer initiates a local transfer operation for the HC context by sending a primitive called "CPDCP-CONTEXT-REQ" to the PDCP entity of the existing PTM RB. The "CPDCP-CONTEXT-REQ" primitive is used when the RRC layer requests that the PDCP entity provide HC context information.

At step 1030, the PTM PDCP entity inserts "N-CONTEXT-C*" into a "CPDCP-CONTEXT-CNF" primitive. The above-described "N-CONTEXT-C*" indicates the HC context information which was used by the header compressor of the existing PTM RB. At step 1035, the PTM PDCP entity sends the "CPDCP-CONTEXT-CNF" primitive to the RRC layer. The "CPDCP-CONTEXT-CNF" primitive includes the HC context used by the header compressor of the PTM RB. The RRC layer of the RNC acquires the HC context of the PTM RB at the above step 1035.

At step 1040, the RRC layer inserts the acquired "N-CONTEXT-C*" into a "CPDCP-CONFIG-REQ" primitive so that the RRC layer can transfer the HC context information to the PDCP entity of the new PTP RB (hereinafter, referred to as "PTP PDCP entity"). At step 1045, the RRC layer transfers the "CPDCP-CONFIG-REQ" primitive to the PTP PDCP entity and completes the local transfer operation for the HC context. Additionally, the header compressor of the new PTP RB acquires the HC context used by the header compressor of the PTM RB. At step 1050, the header compressor of the new PTP RB compresses a header of the MBMS data using the HC context and transfers the MBMS data together with the compressed header to a corresponding UE.

Figure 11:
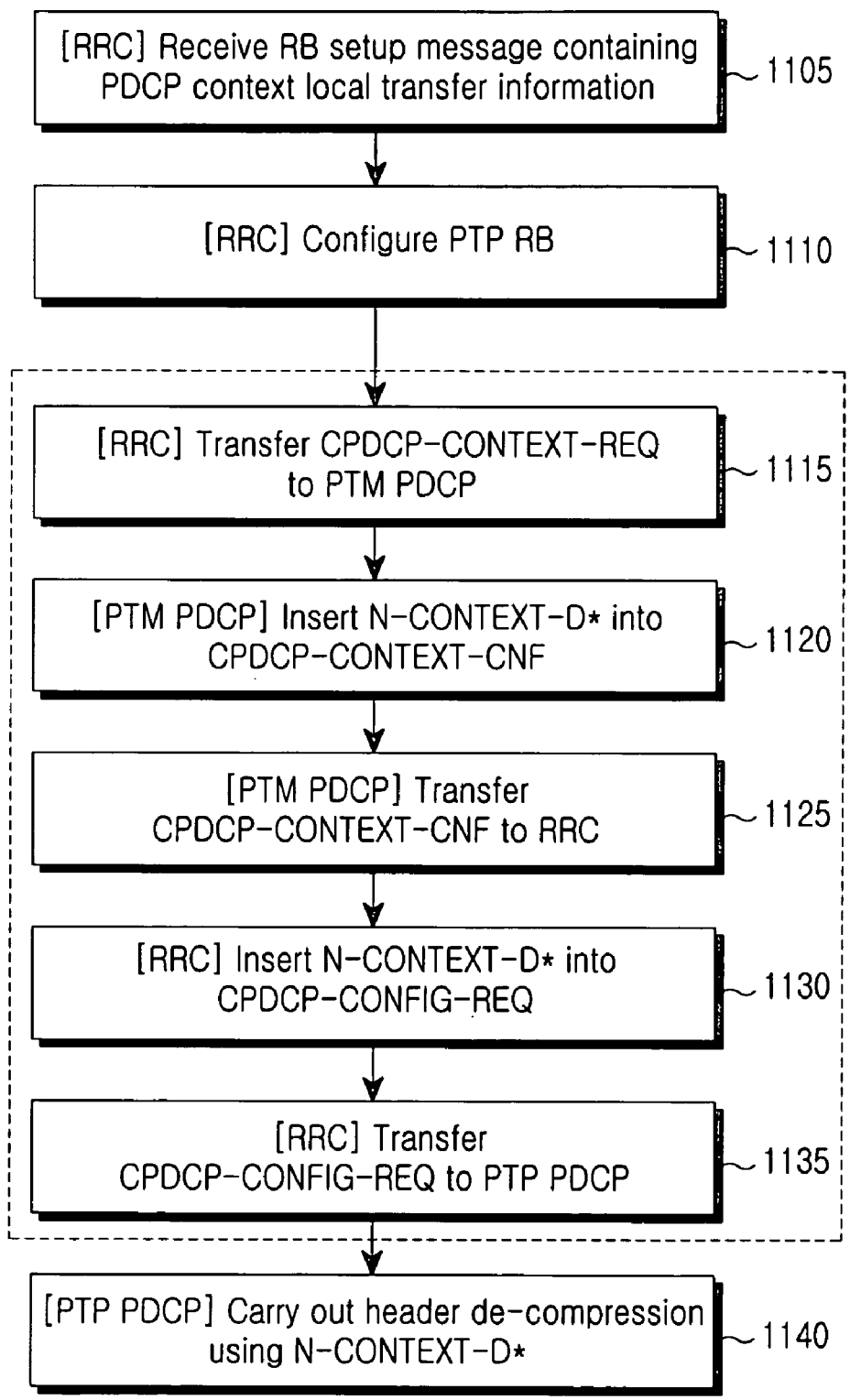
FIG. 11 is a flow chart illustrating an operation of the UE supporting the MBMS service in accordance with a preferred embodiment of the present invention.

FIG. 11 shows an operation performed by the UE in accordance with a preferred embodiment of the present invention. At step 1105, the RRC layer of the UE using the MBMS service via the PTM channel receives an RB setup message from the RNC 905 (FIG. 9). The RB setup message includes configuration information of a PTP RB to be newly configured by the UE 910 (FIG. 9) and PDCP context local transfer information. The PDCP context local transfer information includes an identity of the PTM RB targeted for the HC context local transfer. At step 1110, the RRC layer configures a PTP RB using the PTP RB configuration information. That is, the RRC layer configures the PDCP entity, the header de-compressor, the RLC entity, the MAC entity, etc. so that the MBMS data received via the PTP channel can be processed.

A local transfer operation of the UE will now be described with reference to steps 1115 to 1135. At step 1115, the RRC layer transfers the "CPDCP-CONFIG-REQ" primitive to the PDCP entity of the PTM RB (hereinafter, referred to as "PTM PDCP") corresponding to the PTM RB identity received at the above step 1105 so that HC context of the header de-compressor associated with the newly configured PTP RB can be acquired. At step 1120, the PTM PDCP entity inserts "N-CONTEXT-D*" containing the HC context used by the header de-compressor of the existing PTM RB into the "CPDCP-CONTEXT-CNF" primitive. At step 1125, the PTM PDCP entity sends the "CPDCP-CONTEXT-CNF" primitive to the RRC layer. Because the "CPDCP-CONTEXT-CNF" primitive includes the HC context used by the header de-compressor of the PTM RB, the RRC layer acquires HC context of the PTM RB at the above step 1125.

At step 1130, the RRC layer inserts "N-CONTEXT-D*" into a primitive called "CPDCP-CONFIG-REQ" so that the HC context can be transferred to the PDCP entity of the PTP RB configured above at step 1110 (hereinafter, referred to as "PTP PDCP entity"). At step 1135, the RRC layer transfers the "CPDCP-CONFIG-REQ" primitive to the PTP PDCP entity and then completes the local transfer operation for the HC context. Thus, the header de-compressor of the PTP RB acquires the HC context used by the header de-compressor of the PTM RB. At step 1040, the header de-compressor of the PTP RB de-compresses a header of the received MBMS data using the HC context.

Although the preferred embodiments of the present invention have been disclosed for illustrative purposes, those skilled in the art will appreciate that various modifications, additions and substitutions are possible, without departing from the scope of the invention. This specification has described the situation where a radio network controller (RNC) instructs user equipment (UE) to use header compression (HC) context of a previous radio bearer (RB) using a local transfer instruction when a channel type associated with multimedia broadcast/multicast service (MBMS) service is changed or switched from a point to multipoint (PTM) channel to a point to point (PTP) channel. Alternatively, a new radio bearer can always use the HC context of a previous RB when it is determined that a channel type associated with the identical MBMS service is changed in accordance with a modified embodiment of the present invention. Here, the RNC does not need to send the local transfer instruction to the UE. Of course, the present invention can be applied to all situations where the channel type associated with the identical service is changed as well as the MBMS service as described above. Therefore, the present invention is not limited to the above-described embodiments, and is defined by the claims, which follow, along with their full scope of equivalents.

As apparent from the above description, the present invention can efficiently configure a radio bearer when a channel type is changed or switched by using the identical header compression context irrespective of a channel type supporting packet data service. Moreover, the present invention can reduce a time period required for again setting up a system by using the identical HC context according to a channel change irrespective of the channel type supporting the packet data service.

What is claimed is:

1. A method for establishing header compression (HC) context associated with a header compression and de-compression according to a change of a channel type for a packet data service in a mobile communication system providing the packet data service, the method comprising the steps of:
configuring a radio bearer (RB) of a predetermined channel type used for compressing and de-compressing headers of packets between a radio network controller (RNC) and a user equipment (UE);
providing the packet data service from the RNC to the UE via the RB;
when the channel type is changed, determining configuration information associated with an RB of a new channel type in accordance with a message to the UE from the RNC;
acquiring the HC context used in the RB of the predetermined channel type via primitive exchange with a packet data convergence protocol (PDCP) entity of the RB of the predetermined channel type in the UE in accordance with the configuration information;
configuring the RB of the new channel type based on the acquired HC context; and
continuously providing the packet data service via the RB of the new channel type.

2. The method of claim 1, further comprising:
sending the configuration information associated with the RB of the new channel type and an RB identity indicating the RB of the predetermined channel type, from the RNC to the UE.

3. The method of claim 1, further comprising:
sending the configuration information associated with the RB of the new channel type, an RB identity indicating the RB of the predetermined channel type and an instruction instructing the UE to acquire the HC context used in the RB of the predetermined channel type, from the RNC to the UE.

4. The method of claim 1, wherein the step of configuring the RB of the new channel type further comprises:
configuring the RB of the new channel type in the UE; and
configuring the RB of the new channel type in the RNC when the UE notifies the RNC that the RB of the new channel type has been set up.

5. The method of claim 1, wherein the packet data service is a broadcast or a multicast service in which data from an identical data source is provided to a plurality of UEs including the UE via the RNC.

6. The method of claim 1, wherein the predetermined channel type is a point to multipoint (PTM) type supporting the packet data service via a common channel, and wherein the new channel type is a point to point (PTP) type supporting the packet data service via a dedicated channel.

7. An apparatus for providing packet data service from a radio network controller (RNC) to user equipment (UE) in a mobile communication system, comprising:
a radio resource controller for allocating a radio bearer (RB) of a predetermined channel type to transport packets from the RNC to the UE and controlling the RB; and
a packet data controller for including header compression (HC) context used for compressing headers of the packets on the RB, compressing the headers of the packets using the HC context and sending the packets with the compressed headers to the UE,
wherein the radio resource controller determines configuration information associated with an RB of a new channel type in accordance with a message to the UE from the RNC, when the channel type is changed, acquires the HC context used in the RB of the predetermined channel type via primitive exchange with a packet data convergence protocol (PDCP) entity of the RB of the predetermined channel type in the UE in accordance with the configuration information, and configures the RB of the new channel type based on the acquired HC context.

8. The apparatus of claim 7, wherein the radio resource controller sends to the UE the configuration information associated with the RB of the new channel type and an RB identity indicating the RB of the predetermined channel type.

9. The apparatus of claim 7, wherein the radio resource controller sends to the UE the configuration information associated with the RB of the new channel type, an RB identity indicating the RB of the predetermined channel type and an instruction for directing the HC context used in the RB of the predetermined channel type to be acquired.

10. The apparatus of claim 7, wherein the radio resource controller configures the RB of the new channel type in the RNC when the UE notifies the RNC that the RB of the new channel type has been set up.

11. The apparatus of claim 7, wherein the packet data service is broadcast or multicast service in which data from an identical data source is provided to a plurality of UEs including the UE via the RNC.

12. The apparatus of claim 7, wherein the predetermined channel type is a point to multipoint (PTM) type supporting the packet data service via a common channel, and the new channel type is a point to point (PTP) type supporting the packet data service via a dedicated channel.

13. An apparatus for receiving packet data service from a radio network controller (RNC) by means of user equipment (UE) in a mobile communication system, comprising:
a radio resource controller for allocating a radio bearer (RB) of a predetermined channel type to receive packets from the RNC and controlling the RB; and
a packet data controller for including header compression (HC) context used for de-compressing headers of the packets on the RB and de-compressing the headers of the packets received from the RNC using the HC context, wherein the radio resource controller receives, from the RNC, configuration information associated with an RB of a new channel type when the channel type is changed, acquires the HC context used in the RB of the predetermined channel type via primitive exchange with a packet data convergence protocol (PDCP) entity of the RB of the predetermined channel type in the UE in accordance with the configuration information; and configures the RB of the new channel type based on the acquired HC context.

14. The apparatus of claim 13, wherein the radio resource controller further receives from the RNC the configuration information associated with the RB of the new channel type and an RB identity indicating the RB of the predetermined channel type.

15. The apparatus of claim 13, wherein the radio resource controller further receives from the RNC the configuration information associated with the RB of the new channel type, an RB identity indicating the RB of the predetermined channel type and an instruction instructing the HC context used in the RB of the predetermined channel type to be acquired.

16. The apparatus of claim 13, wherein after configuring the RB of the new channel type, the radio resource controller further notifies the RNC that the RB of the new channel type has been set up.

17. The apparatus of claim 13, wherein the packet data service is selected from a broadcast and a multicast service in which data from an identical data source is provided to a plurality of UEs including the UE via the RNC.

18. The apparatus of claim 13, wherein the predetermined channel type is a point to multipoint (PTM) type supporting the packet data service via a common channel, and wherein the new channel type is a point to point (PTP) type supporting the packet data service via a dedicated channel.

\* \* \* \* \*